United States Patent
Martin et al.

(10) Patent No.: US 8,056,814 B2
(45) Date of Patent: Nov. 15, 2011

(54) COMBINED EAS/RFID TAG

(75) Inventors: Philippe Martin, Beaune (FR); David Malcolm Hall, Lockleys (AU)

(73) Assignee: Tagsys SAS (FR)

( * ) Notice: Subject to any disclaimer, the term of this patent is extended or adjusted under 35 U.S.C. 154(b) by 311 days.

(21) Appl. No.: 12/380,404

(22) Filed: Feb. 26, 2009

(65) Prior Publication Data

US 2010/0001079 A1 Jan. 7, 2010

Related U.S. Application Data

(60) Provisional application No. 61/067,308, filed on Feb. 27, 2008.

(51) Int. Cl.
*G06K 19/00* (2006.01)

(52) U.S. Cl. .......................... 235/487; 235/492; 235/493

(58) Field of Classification Search .................. 235/375, 235/383, 385, 449, 451, 487, 492, 493, 494
See application file for complete search history.

(56) References Cited

U.S. PATENT DOCUMENTS

| | | | | |
|---|---|---|---|---|
| 5,182,544 A * | 1/1993 | Aquilera et al. | ............ | 340/572.5 |
| 5,939,984 A * | 8/1999 | Brady et al. | ................ | 340/572.1 |
| 6,025,780 A * | 2/2000 | Bowers et al. | ............. | 340/572.3 |
| 6,121,878 A * | 9/2000 | Brady et al. | ................ | 340/572.1 |
| 6,154,137 A * | 11/2000 | Goff et al. | ................... | 340/572.4 |
| 6,232,870 B1 * | 5/2001 | Garber et al. | ................ | 340/10.1 |
| 6,407,669 B1 * | 6/2002 | Brown et al. | .............. | 340/572.1 |
| 6,424,262 B2 * | 7/2002 | Garber et al. | .............. | 340/572.3 |
| 6,429,776 B1 * | 8/2002 | Alicot et al. | ................ | 340/572.1 |
| 6,693,541 B2 * | 2/2004 | Egbert | ......................... | 340/572.7 |
| 7,002,475 B2 * | 2/2006 | Brady et al. | ................ | 340/572.7 |
| 7,084,770 B2 * | 8/2006 | Brady et al. | ................ | 340/572.7 |
| 7,109,867 B2 * | 9/2006 | Forster | ........................ | 340/572.3 |
| 7,183,917 B2 * | 2/2007 | Piccoli et al. | .............. | 340/572.1 |
| 7,304,574 B2 * | 12/2007 | Romer et al. | .............. | 340/572.1 |
| 7,463,155 B2 * | 12/2008 | Narlow et al. | ............. | 340/572.7 |
| 7,482,933 B2 * | 1/2009 | Nauer | ......................... | 340/572.7 |
| 7,527,198 B2 * | 5/2009 | Salim et al. | .................... | 235/385 |
| 7,692,543 B2 * | 4/2010 | Copeland et al. | ........... | 340/572.1 |
| 7,701,343 B2 * | 4/2010 | Copeland et al. | ........... | 340/572.1 |
| 7,750,792 B2 * | 7/2010 | Smith et al. | ................... | 340/10.4 |
| 7,804,407 B2 * | 9/2010 | Copeland | .................... | 340/572.1 |
| 7,804,410 B2 * | 9/2010 | Copeland | .................... | 340/572.7 |
| 7,804,411 B2 * | 9/2010 | Copeland | .................... | 340/572.7 |
| 7,812,729 B2 * | 10/2010 | Copeland | .................... | 340/572.7 |
| 2004/0233042 A1 * | 11/2004 | Piccoli et al. | ................. | 340/10.1 |
| 2005/0001725 A1 * | 1/2005 | Brady et al. | ................ | 340/572.7 |
| 2005/0162278 A1 * | 7/2005 | Brady et al. | ................ | 340/572.8 |
| 2005/0270159 A1 * | 12/2005 | Brady et al. | ................ | 340/572.1 |
| 2006/0049947 A1 * | 3/2006 | Forster | ........................ | 340/572.3 |
| 2006/0187042 A1 * | 8/2006 | Romer et al. | .............. | 340/572.1 |
| 2006/0273902 A1 * | 12/2006 | Shafer et al. | ............... | 340/572.1 |
| 2006/0273910 A1 * | 12/2006 | Narlow et al. | ............. | 340/572.7 |

(Continued)

*Primary Examiner* — Daniel Hess
*Assistant Examiner* — Paultep Savusdiphol
(74) *Attorney, Agent, or Firm* — Lerner, David, Littenberg, Krumholz & Mentlik, LLP

(57) ABSTRACT

A combined EAS/RFID tag including an EAS circuit and a first RFID circuit is disclosed. The EAS circuit has at least one capacitor and the RFID circuit has a main antenna wherein at least a part of the capacitor of the EAS circuit provides at least a part of the main antenna of the RFID circuit. The EAS circuit may include two capacitors and each capacitor may include first and second plates on first and second sides of a substrate wherein one plate of each capacitor forms part of the main antenna of the RFID circuit.

10 Claims, 5 Drawing Sheets

U.S. PATENT DOCUMENTS

| | | | |
|---|---|---|---|
| 2007/0040688 A1* | 2/2007 | Cocita et al. | 340/572.7 |
| 2007/0262865 A1* | 11/2007 | Copeland et al. | 340/572.7 |
| 2007/0296594 A1* | 12/2007 | Copeland et al. | 340/572.7 |
| 2008/0068177 A1* | 3/2008 | Copeland | 340/572.7 |
| 2008/0088417 A1* | 4/2008 | Smith et al. | 340/10.41 |
| 2008/0088460 A1* | 4/2008 | Copeland | 340/572.7 |
| 2008/0150719 A1* | 6/2008 | Cote et al. | 340/572.1 |
| 2009/0108996 A1* | 4/2009 | Day | 340/10.1 |
| 2009/0189768 A1* | 7/2009 | Copeland et al. | 340/572.7 |

* cited by examiner

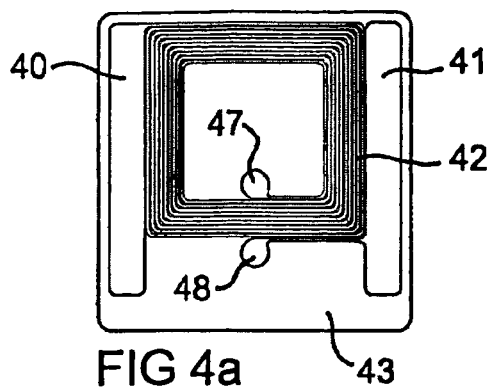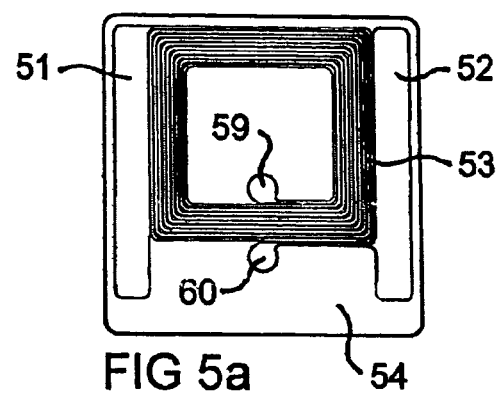
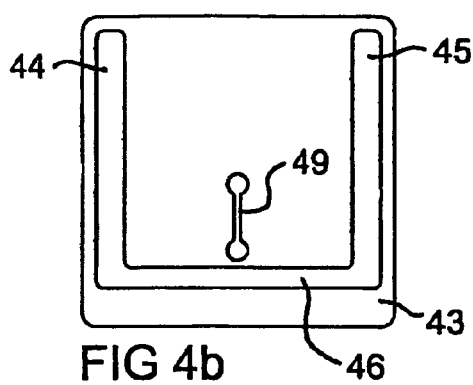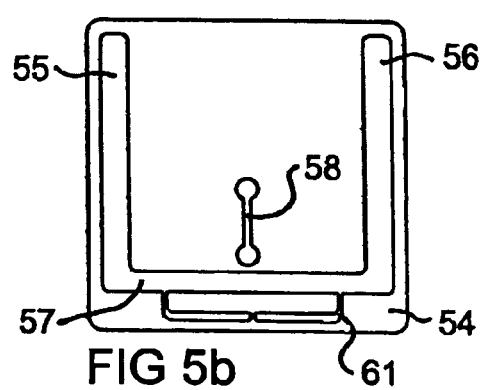
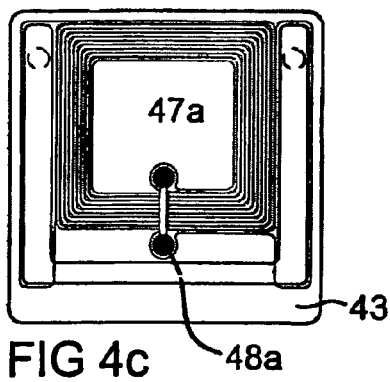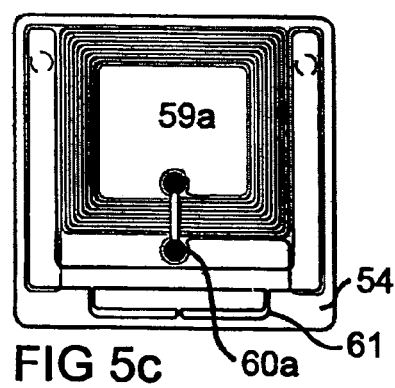
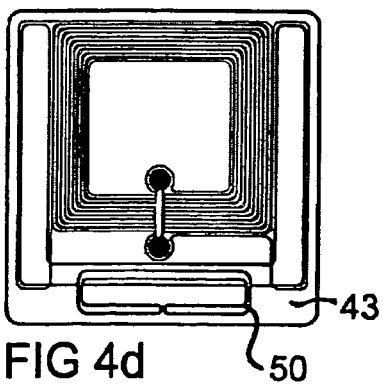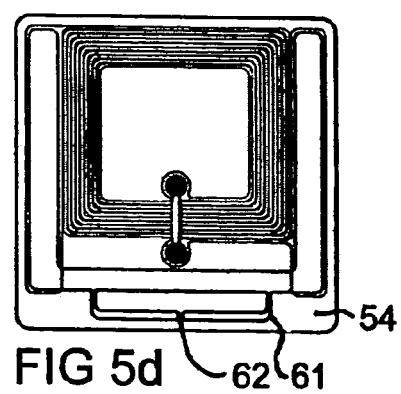

COMBINED EAS/RFID TAG

CROSS-REFERENCE TO RELATED APPLICATIONS

This application claims the benefit of the filing date of U.S. Provisional Patent Application No. 61/067,308 filed Feb. 27, 2008, the disclosure of which is hereby incorporated herein by reference.

FIELD OF THE INVENTION

The present invention relates to an electronic tag having combined Electronic Article Surveillance (EAS) and Radio Frequency Identification (RFID) functions.

There exists a need for combining EAS and RFID functions in a retail environment. Many retail outlets that make use of EAS for deterring shoplifting also rely on information obtained via RFID technology for inventory control purposes. Retail outlets already spend considerable money for EAS hard tags that are re-useable. Adding an RFID function to the EAS tags may be easily justified due to improved productivity in inventory control as well as deterring shoplifting.

In order to minimize interactions between EAS and RFID elements, prior art attempts at combining EAS and RFID functions have placed the EAS element and the RFID element far apart in an end-to-end or side-by-side relationship in an effort to minimize the interactions between the elements. However, this leads to an increase in size of the combined tag which is undesirable.

SUMMARY OF THE INVENTION

The present invention may provide a combined EAS and RFID tag that at least alleviates the problem of increased size of a combined EAS/RFID tag while maintaining acceptable levels of performance for tracking articles in inventory (RFID function) as well as securing articles leaving a retail outlet (EAS function).

According to one aspect of the present invention there is provided a combined EAS/RFID tag including an EAS circuit and a first RFID circuit, said EAS circuit having at least one capacitor and said RFID circuit having a main antenna wherein at least a part of said capacitor of said EAS circuit provides at least a part of said main antenna of said RFID circuit.

The combined EAS/RFID tag is arranged such that the EAS circuit shares at least one common element with the RFID circuit. Typically the EAS circuit has a resonator including a coil (inductor) and a capacitor. Typically the RFID circuit includes a primary antenna and an integrated circuit (IC). To increase reading range of the RFID circuit, the RFID circuit typically includes a (larger) main or secondary antenna. Components of the EAS and RFID circuits are preferably formed on opposite sides of a common substrate. At least one capacitor plate of the EAS circuit may be provided on a first side of the substrate. At least one capacitor plate of the EAS circuit may be provided on a second side of the substrate. The capacitor plates may be positioned relative to each other on the substrate such that the substrate provides a dielectric between the plates. The capacitor plate on the first side of the substrate may form a part of the EAS circuit. The capacitor plate on the second side of the substrate may form a part of the RFID circuit such as an antenna part. The capacitor plate on the second side of the substrate may also form a part of the EAS circuit. The capacitor plates on the first and second sides of the substrate may form a capacitor of the EAS resonator.

The antenna part and the capacitor parts each require substantial portions of the available area of the substrate to be devoted to their realization and hence a substantial portion of the overall size of the tag. By arranging the EAS and RFID circuits such that they share a common part that may require a substantial portion of the substrate to be devoted to it, the size of the combined EAS and RFID circuits may be correspondingly reduced.

BRIEF DESCRIPTION OF THE DRAWINGS

Preferred embodiments of the present invention will now be described with reference to the accompanying drawings wherein:

FIGS. 4 (a) to 4(d) show layers of a combined EAS/RFID tag according to an embodiment of the present invention;

FIGS. 5(a) to 5(d) show layers of a combined EAS/RFID tag according to a further embodiment of the present invention;

DETAILED DESCRIPTION

Figure 3:
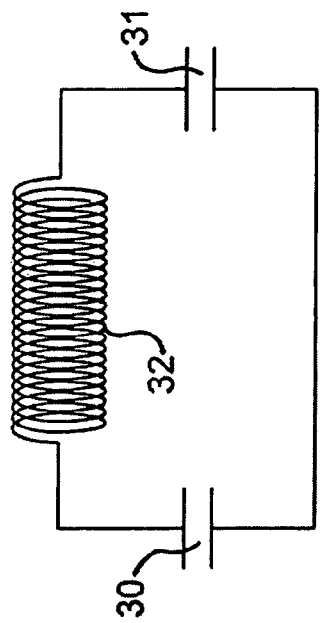
FIG. 3 shows a schematic diagram of an EAS circuit.
Figure 1A:
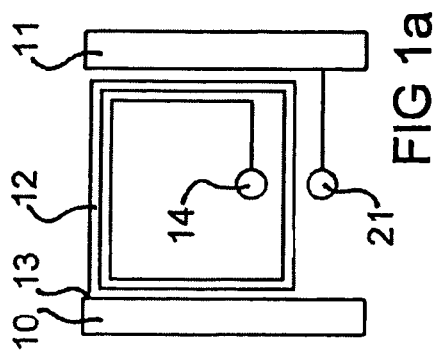
FIGS. 1 (a) and (b) show a layout of components of a combined EAS/RFID tag according to the present invention.

FIG. 1(a) shows a first layer of a combined EAS/RFID tag. The first layer includes parts of an EAS circuit including first plates 10, 11 of respective capacitors 30, 31 (refer FIG. 3) of an EAS resonator. The first layer includes coil 12 of inductor 32 of the EAS resonator. One end 13 of coil 12 terminates outside coil 12 and is connected to capacitor plate 10. The other end 14 of coil 12 terminates inside coil 12 and is connected to capacitor plate 11 as described below. The first layer is provided on a first side of a substrate in any suitable manner and by any suitable means such as by acid etching a suitable conductive material applied to the substrate.

Figure 1B:
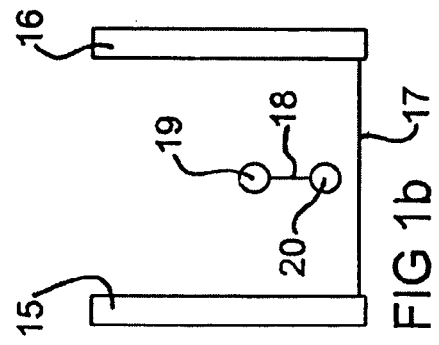

FIG. 1(b) shows a second layer of the combined EAS/RFID tag. The second layer includes parts of the EAS circuit including second plates 15, 16 of capacitor 30, 31 of the EAS resonator. The second layer includes conductive track 17 linking second plates 15, 16. One function of track 17 is to provide a connection between second plates 15, 16 to complete a series circuit for the EAS resonator (refer FIGS. 2 and 3). The second layer is provided on a second side of the substrate in any suitable manner and by any suitable means such as by acid etching a suitable conductive material applied to the substrate. Another function of track 17 is to complete a U-shaped dipole antenna on the second side of the substrate. The dipole antenna may provide a secondary antenna for the RFID circuit as described below.

The second layer includes a bridge 18 for linking end 14 of coil 12 to capacitor plate 11. Bridge 18 includes terminal lands 19, 20 for joining to terminal lands 14, 21 on the first layer. The terminal lands on the first and second layers may be electrically joined in any suitable manner and by any suitable means such as by means of mechanical crimping through a relatively thin substrate. The crimping should be performed with sufficient pressure to deform the lands and break through the substrate to provide an interference connection between the lands. The substrate may include any suitable insulating material such as oriented polypropylene (OPP).

Figure 2A:
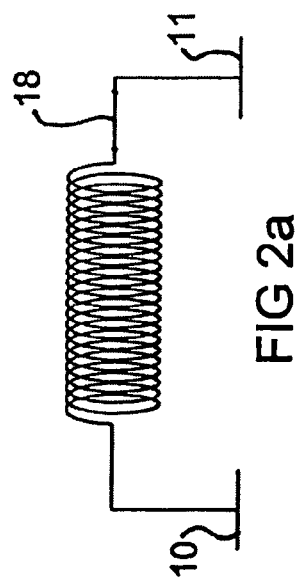
FIGS. 2 (a) and (b) show schematic diagrams corresponding to FIGS. 1 (a) and 1 (b)
Figure 2B:
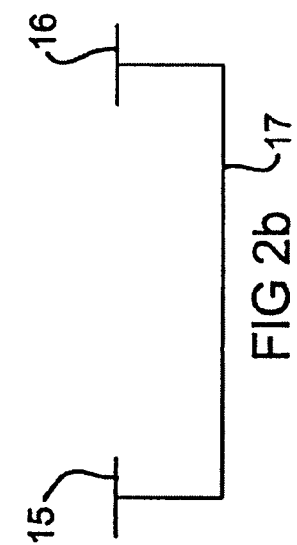

FIG. 2(a) shows a schematic diagram of components in FIG. 1(a) and FIG. 2(b) shows a schematic diagram of components in FIG. 1(b). FIG. 2(a) corresponds to the upper half of the EAS resonator shown in FIG. 3 and FIG. 2(b) corresponds to the lower half of the EAS resonator shown in FIG. 3.

FIG. 4(a) shows a first layer of a combined EAS/RFID tag. The first layer includes first plates 40, 41 of respective capacitors of an EAS circuit and coil 42 of an inductor of the EAS circuit. The first layer is provided on a first side of OPP substrate 43.

FIG. 4(b) shows a second layer of the combined EAS/RFID tag. The second layer includes second plates 44, 45 or the respective capacitors of the EAS circuit and track 46 linking second plates 44, 45. The second layer is provided on a second side of OPP substrate 43. The second layer includes bridge 49 for linking lands 47, 48 on the first layer. Land 47 is associated with one end of coil 42 and land 48 is associated with first capacitor plate 41.

FIG. 4(c) shows the first and second layers provided on substrate 43 and crimpings 47a, 48a applied to lands 47, 48 of the first layer and associated ends of bridge 49 to complete the series circuit for the EAS resonator.

FIG. 4(d) shows a view similar to FIG. 4(c) and includes a separate primary antenna loop 50 associated with a UHF RFID circuit. The RFID circuit includes a separately formed adaptive kernel (AK) module (UHF tag) manufactured by Tagsys SAS.

FIG. 5(a) shows a first layer of a combined EAS/RFID tag including first plates 51, 52 of respective capacitors of an EAS circuit and coil 53 of the EAS circuit not unlike FIG. 4(a). The first layer is provided on one side of OPP substrate 54.

FIG. 5(b) shows a second layer of the combined EAS/RFID tag including second plates 55, 56 of the respective capacitors of the EAS circuit and track 57 linking second plates 55, 56. The second layer also includes bridge 58 for linking lands 59, 60 on the first layer not unlike FIG. 4(b). The second layer is provided on an opposite side of OPP substrate 54. The second layer includes a C-shaped antenna 61 that is integrally linked with track 57 to provide a primary antenna loop for an RFID circuit (the loop is completed via track 57).

FIG. 5(c) shows the first and second layers provided on substrate 54 and crimpings 59a, 60a applied to lands 59, 60 of the first layer and associated ends of bridge 58 to complete the series circuit for the EAS resonator. The RFID circuit includes IC module 62 as shown in FIG. 5(d).

FIGS. 6(a) to 6(d) show a modification of the EAS/RFID tag of FIGS. 5(a) to 5(d) to provide a HF RFID function in addition to the EAS and UHF RFID functions provided by the embodiment of FIGS. 5(a) to 5(d).

Figure 6A:
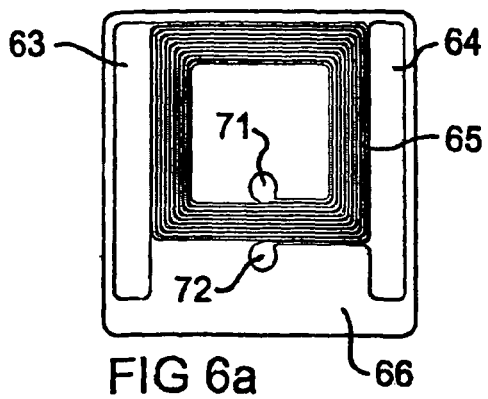
FIGS. 6(a) to 6(d) show layers of a combined tag according to an embodiment of the present invention.

FIG. 6(a) shows a first layer of a combined tag including first plates 63, 64 of respective capacitors of an EAS circuit and coil 65 of the EAS circuit not unlike FIG. 5(a). The first layer is provided on one side of OPP substrate 66.

Figure 6B:
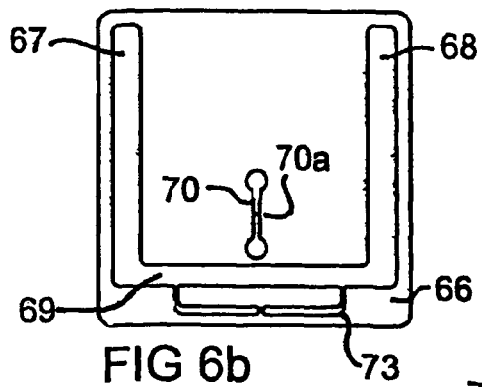
Figure 6D:
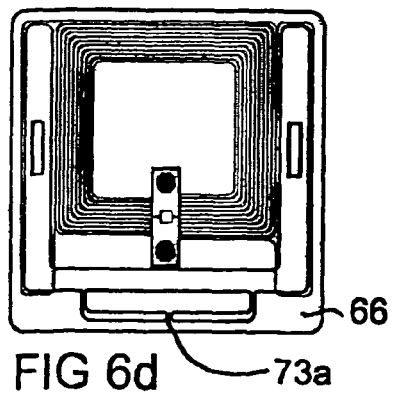

FIG. 6(b) shows a second layer of the combined tag including second plates 67, 68 of the respective capacitors of the EAS circuit and track 69 linking second plates 67, 68. The second layer includes bridge 70 for linking lands 71, 72 of the first layer. The second layer is provided on an opposite side of OPP substrate 66. The second layer includes C-shaped antenna 73 that is integrally linked with track 69 to provide a primary antenna loop for the RFID circuit. The RFID circuit includes IC module 73a as shown in FIG. 6(d).

Figure 8A:
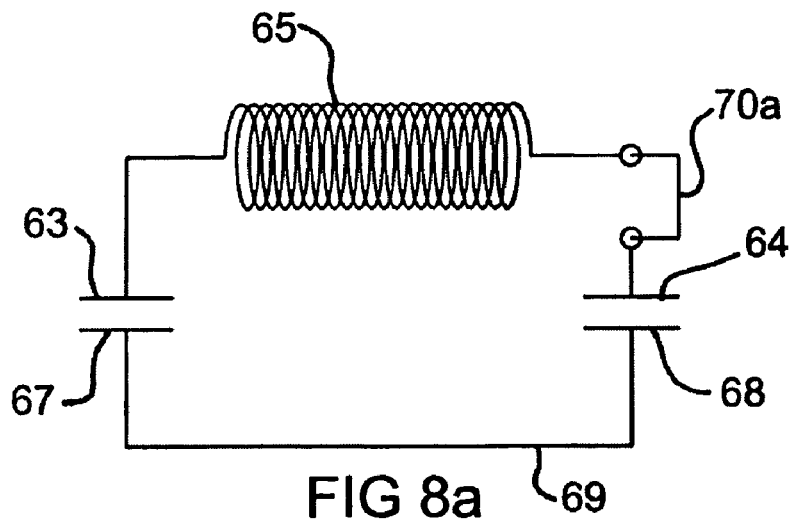
FIGS. 8(a) to 8(c) show schematic diagrams of the EAS circuit corresponding to FIG. 6.
Figure 8B:
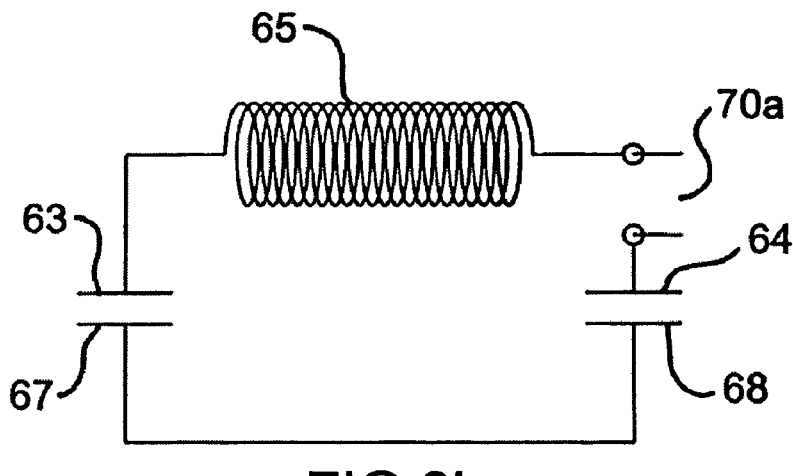

The modification includes cutting 70a applied via a laser, or the like to bridge 70 (refer FIGS. 8(a) and 8(b)) to receive an RFID strap 74 comprising a small substrate and IC chip 75 connected to conductive pads 76, 77 to enable the pads to be attached to lands 71, 72 via crimpings 71a, 72a or the like.

The modified EAS/RFID tag may provide three functions, namely:
an EAS anti-theft circuit;
a HF RFID circuit using coil 65 of the EAS circuit as an antenna; and
a UHF RFID circuit.

FIG. 7(a) to 7(d) show a modification of the EAS/RFID tag of FIGS. 4(a) to 4(d) to provide a HF RFID function in addition to the EAS and UHF RFID functions provided by the embodiment of FIGS. 4(a) to 4(d).

Figure 7A:
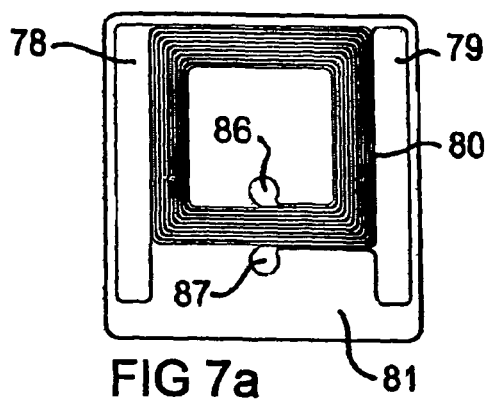
FIGS. 7(a) to 7(d) show layers of a combined tag according to a further embodiment of the present invention.

FIG. 7(a) shows a first layer of a combined tag including first plates 78, 79 of respective capacitors of an EAS circuit and coil 80 of the EAS circuit not unlike FIG. 4(a). The first layer is provided on one side of OPP substrate 81.

Figure 7B:
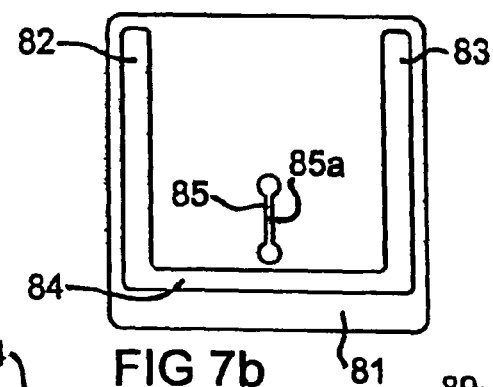
Figure 6C:
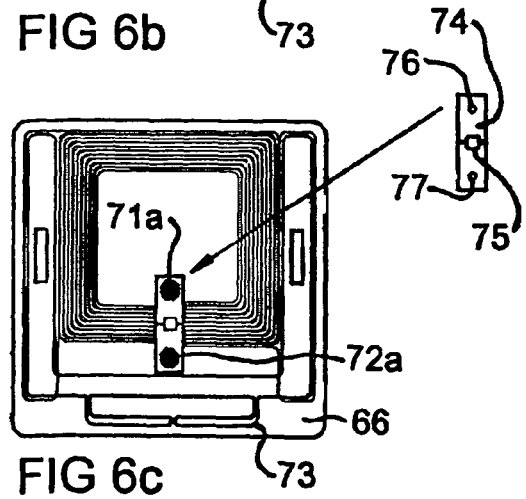

FIG. 7(b) shows a second layer of the combined tag including second plates 82, 83 of the respective capacitors of the EAS circuit and track 84 linking second plates 82, 83. The second layer includes bridge 85 for linking lands 86, 87 on the first layer. The second layer is provided on an opposite side of OPP substrate 81.

Figure 7C:
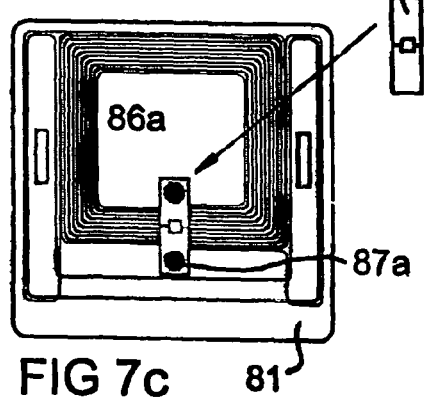

FIG. 7(c) shows the first and second layers provided on substrate 81 and crimpings 86a, 87a applied to lands 86, 87 of the first layer and associated ends of bridge 85 to complete the series circuit for the EAS resonator.

Figure 7D:
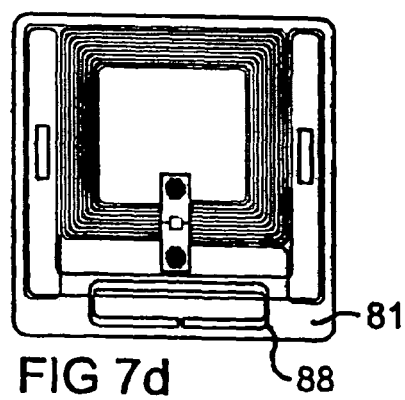

FIG. 7(d) shows a view similar to FIG. 7(c) and includes a separate primary antenna loop 88 associated with an RFID circuit included with a separately formed AK module (UHF tag) manufactured by Tagsys SAS.

The modification includes laser cutting 85a of bridge 85 to receive an RFID strap 89 comprising a small substrate and an IC chip. The modified embodiment may provide three functions including an EAS circuit, a HF RFID circuit and a UHF RFID circuit.

Figure 8C:
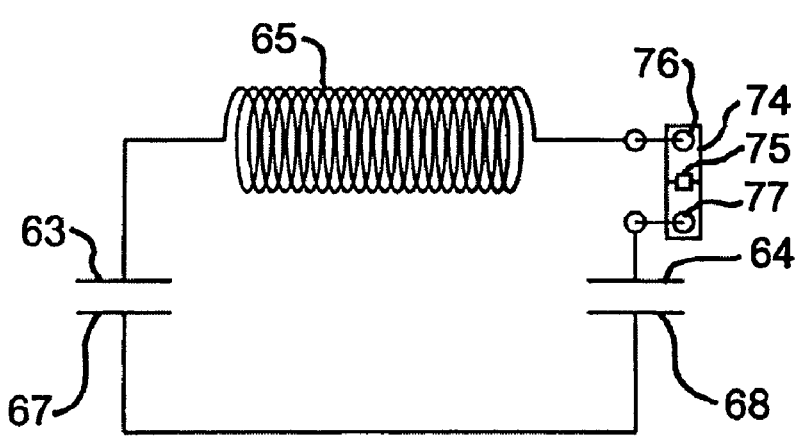

FIGS. 8(a) to 8(c) are schematic diagrams of the EAS circuit shown in FIGS. 6(a) to 6(d) wherein parts labelled with like reference numerals correspond to like parts in FIGS. 6(a) to 6(d).

Figure 9:
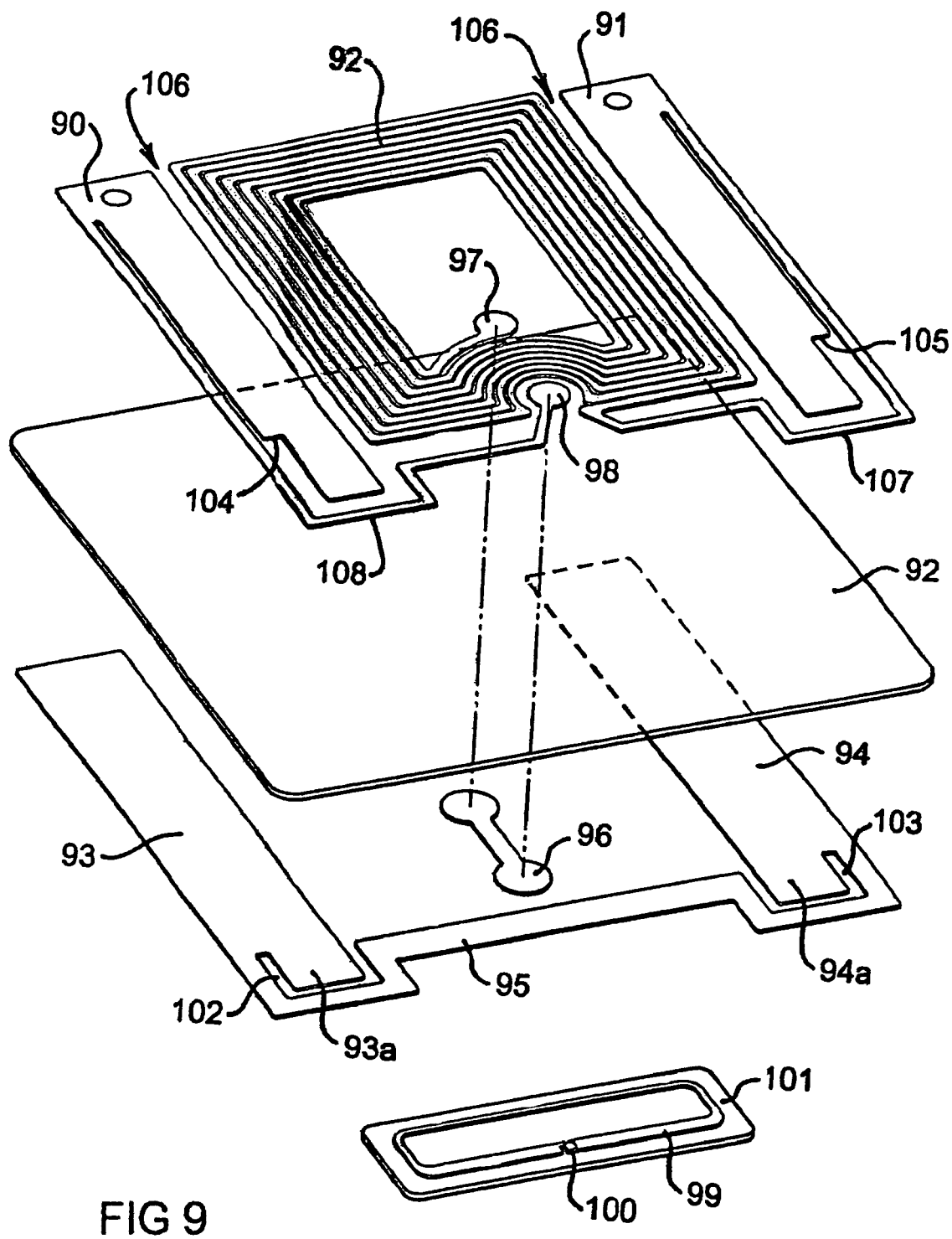
FIG. 9 shows layers of a combined EAS/RFID tag according to a further embodiment of the present invention.

FIG. 9 shows layers of a combined EAS/RFID tag. A first layer includes first plates 90, 91 of respective capacitors of an EAS circuit and coil 92 of an inductor of the EAS circuit. The first layer is provided on a first side of PET substrate 92. A second layer includes second plates 93, 94 of the respective capacitors of the EAS circuit and track 95 linking second plates 93, 94. The second layer is provided on a second side of PET substrate 92.

The second layer includes bridge 96 for linking lands 97, 98 on the first layer, land 97 being associated with one end of coil 92 and land 98 being associated with first capacitor plate 90. Bridge 96 may be linked with lands 97, 98 in any suitable manner and by any suitable means such as crimping.

Plates 93, 94 and track 95 of the second layer also form a C-shaped UHF dipole antenna for an RFID circuit. The RFID circuit includes a separately formed AK module (UHF tag) including primary antenna loop 99 and IC chip 100 provided on separate insulating substrate 101. The long edge of loop 99 couples electromagnetically to track 95 of the second layer via substrate 101 and an adhesive. The second layer may be thicker than the first layer.

Plates 93, 94 include respective slots 102, 103 for tuning the dipole antenna to a correct frequency (e.g. 866 MHZ). The slots 102, 103 may be made longer by laser trimming to tune the antenna to a lower frequency.

If slots 102, 103 were shorter the antenna would be tuned to a higher frequency. Hence plates 93, 94 may be considered to be blanks which may be laser trimmed to a correct operating frequency. Plates 93, 94 may be trimmed to enable the dipole antenna to operate at a higher frequency (915 or 950 MHz) to compensate for packaging that tends to lower frequency. Laser trimming of plates 93, 94 may also be used to correct tolerances inherent in materials and assembly. Plates 90, 91 include corresponding notches 104, 105 to enable plates 93, 94 to be trimmed without changing HF capacitance.

Separation 106 between capacitor plates 93, 94 and coil 92 preferably is substantially constant to maintain parasitic capacitance between plates 93, 94 and coil 92 which at UHF frequencies resembles a slab of conductor rather than a coil. Plates 93, 94 are slightly larger than plates 90, 91 as this may better maintain parasitic capacitance between coil 92 and the UHF antenna. The parasitic capacitance is undesired but may be compensated. It may also allow plates 90, 91 to be laser trimmed without affecting parasitic capacitance between the UHF antenna and coil 92 and without affecting UHF structure outline in general.

Coil 92 is connected to plate 91 via elongate track 107. The other end of coil 92 is connected to plate 90 via elongate track 108. The width of each track 107, 108 is chosen such that it may operate as a micro-stripline with the UHF antenna as its ground plane even in regions where the UHF antenna is a track itself. The length of each track 107, 108 may be a quarter wavelength at the UHF operating frequency in the substrate. In the example shown it is 61.5 mm long for 866 MHz operation.

Tracks 107, 108 are a key to making the HF EAS circuit invisible to the UHF RFID circuit when operating at UHF frequencies. UHF current distribution is such that current flowing on the main UHF parts makes its way towards the end of each capacitor plate, its magnitude reducing from a maximum as path length increases from a point of symmetry of the dipole. However, when the current reaches capacitive hats 93a, 94a it sees the HF capacitor plate and some current flows across the capacitors and thus in the HF layer. As mentioned above, coil 92 with small spaces between its windings tends to have the appearance of a slab of conductor so UHF capacitive hats 93a, 94a are somewhat shorted together and a low impedance path appears between UHF capacitive hats 93a, 94a via the HF layer. By placing connection between capacitor plate 91 and HF coil 92 over the UHF dipole as a quarter-wave micro-stripline, currents that enter the HF layer capacitor plate via the UHF layer capacitor plate see coil 92 connected through this quarter-wave line and thus see coil 92 as a high impedance (virtual open circuit). Hence minimal current flows through the HF coil and thus minimal parasitic impedance appears between the UHF antenna capacitive hats 93a, 94a and the UHF antenna operates without seeing the HF capacitor or coil 92. By making the antenna symmetrical with reference to the micro-stripline, capacitive hats 93a, 94a may be isolated from the HF capacitors and HF coil 92. When operating at HF, the micro-striplines just add to HF layer capacitive plate area.

The dimensions of the tag may be 47 mm×47 mm overall conductor on a 50 mm×50 mm substrate.

A HF RFID chip may be inserted in series with coil 92 at a gap somewhere in coil 92. The HF capacitor layer may be adjusted and the HF feature may be RFID instead of EAS.

Finally, it is to be understood that various alterations, modifications and/or additions may be introduced into the constructions and arrangements of parts previously described without departing from the spirit or ambit of the invention.

The invention claimed is:

1. A combined EAS/RFID tag including an EAS circuit and a first RFID circuit, said EAS circuit having two capacitors and said RFID circuit having a main antenna, a substrate having a first side and a second side, said EAS and RFID circuits being provided on said substrate, each of said two capacitors of said EAS circuit including first and second plates on said first and second sides of said substrate, respectively, wherein one of said plates of each of said capacitors forms at least a part of said main antenna of said RFID circuit, wherein said EAS circuit includes a coil and said part of said capacitor of said EAS circuit is connected to said coil by means of a micro-stripline having a length that substantially corresponds to a quarter wavelength at an operating frequency of said RFID circuit.

2. A combined EAS/RFID tag according to claim 1 wherein said main antenna includes a U-shaped dipole and wherein said second plates of said two capacitors form legs of said U-shaped dipole.

3. A combined EAS/RFID tag according to claim 1 wherein said EAS circuit is adapted to operate at a HF frequency and said RFID circuit is adapted to operate at a UHF frequency.

4. A combined EAS/RFID tag according to claim 1 wherein said RFID circuit includes a relatively small primary antenna and an IC module.

5. A combined EAS/RFID tag according to claim 4 wherein said primary antenna is adapted for electromagnetic coupling with said main antenna.

6. A combined EAS/RFID tag according to claim 4 wherein said primary antenna and said IC module are provided on a separate substrate.

7. A combined EAS/RFID tag according to claim 4 wherein said primary antenna and said IC module are provided on said first side of said substrate.

8. A combined EAS/RFID tag according to claim 1 wherein said RFID circuit includes a relatively small primary antenna and an IC module, said primary antenna being adapted for electromagnetic coupling with said main antenna and wherein said primary antenna and said IC module are provided on a separate substrate.

9. A combined EAS/RFID tag according to claim 1 including an RFID strap interposed in said EAS circuit to provide a second RFID circuit.

10. A combined EAS/RFID tag according to claim 9 wherein said first RFID circuit is adapted to operate at a UHF frequency and said second RFID circuit is adapted to operate at a HF frequency.

* * * * *